Nov. 2, 1948.　　　G. HECHT ET AL　　　2,452,655
CATHODE-RAY OSCILLOSCOPE CIRCUIT
Filed April 25, 1947　　　　　　　　　　2 Sheets-Sheet 1

FIG. I

INVENTORS: G. HECHT
L. A. MEACHAM
BY
D. MacKenzie
AGENT

Nov. 2, 1948.   G. HECHT ET AL   2,452,655
CATHODE-RAY OSCILLOSCOPE CIRCUIT
Filed April 25, 1947   2 Sheets—Sheet 2

INVENTORS: G. HECHT
L. A. MEACHAM
BY
AGENT

Patented Nov. 2, 1948

2,452,655

UNITED STATES PATENT OFFICE 2,452,655

CATHODE-RAY OSCILLOSCOPE CIRCUIT

George Hecht, Astoria, N. Y., and Larned A. Meacham, Summit, N. J., assignors to Bell Telephone Laboratories, Incorporated, New York, N. Y., a corporation of New York Application April 25, 1947, Serial No. 743,980

5 Claims. (Cl. 315—22)

This invention relates to an improvement in cathode ray tube circuits, particularly useful where it is desired to establish a bright vertical reference line horizontally centered on the screen of the oscilloscope, the trace of the electron beam being elsewhere blanked in the absence of an impulse corresponding, say, to the echo of a radar beam from an observed object. The invention may be termed "a coincidence circuit," for the reason that the bright vertical line appears when the horizontal deflecting voltage, or current, passes through zero.

It is common in such circuits to use a tube having vertical and horizontal pairs of electrostatic deflection plates and to arrange that a deflecting voltage on the horizontal plates be synchronized with the left and right pointing of a radar beam searching for a distant object, while a rapidly repetitive sweep voltage is applied to the vertical plates. It is arranged that an echo received from the object shall create a brightening voltage on the intensity grid of the cathode ray tube, producing a bright spot on the screen in a position corresponding vertically to the range and horizontally to the azimuth of the reflecting object from a reference direction, the central pointing of the exploring beam. An azimuth voltage sweeps, as the radar beam moves left and right, between positive and negative values, passing through zero when the beam passes through the reference direction. To define this direction horizontally, in the present invention the horizontal plates are maintained at the same potential in the absence of a deflecting voltage.

By known means the azimuth voltage, whatever its polarity, is enabled to change the potentials of the horizontal plates equally and oppositely by amounts proportional to the instantaneous azimuth of the beam, whereby the mean potential of the plates is kept constant but the electron stream is deflected to left or right of the vertical center line of the oscilloscope screen as the radar beam itself is moved. If to the intensity grid of the oscilloscope a potential is applied of suitable magnitude to permit the electron stream to illuminate the screen, the entire screen would be bright, because of the recurrent vertical and horizontal sweeps. Provision is therefore made for decreasing the intensity grid voltage to suppress the electron stream until a received echo momentarily unblanks the trace.

To refer the echo spot to the vertical horizontally centered line of the screen, this line must be made continuously bright, suppressing the trace either side of center. This is accomplished by the circuit of the present invention, which so controls the voltage on the intensity grid that the trace is blanked except at the center of the horizontal sweep. Brightening voltage pulses corresponding to radar echoes are applied to the intensity grid by means unconnected with the present invention.

It is therefore the general object of the invention to facilitate the location in azimuth of an object detected by a searching radar beam and represented by a bright spot on the screen of a cathode ray oscilloscope. Particularly, an object of the invention is to provide means for establishing a bright vertical line on the screen in a central position corresponding to the passage through zero of a voltage which varies with the pointing of the radar beam and is zero when that pointing is in the reference direction.

When the objects searched for are of considerable size, it is allowable to have the vertical bright line of width convenient for observation without risk of obscuring the echo spot, if this coincides with the central position. The circuit of the invention includes means for varying as desired the width of the reference line, and this is another object of the invention.

The invention will be understood from the following description, referring to the accompanying drawings in which.

Figure 1:
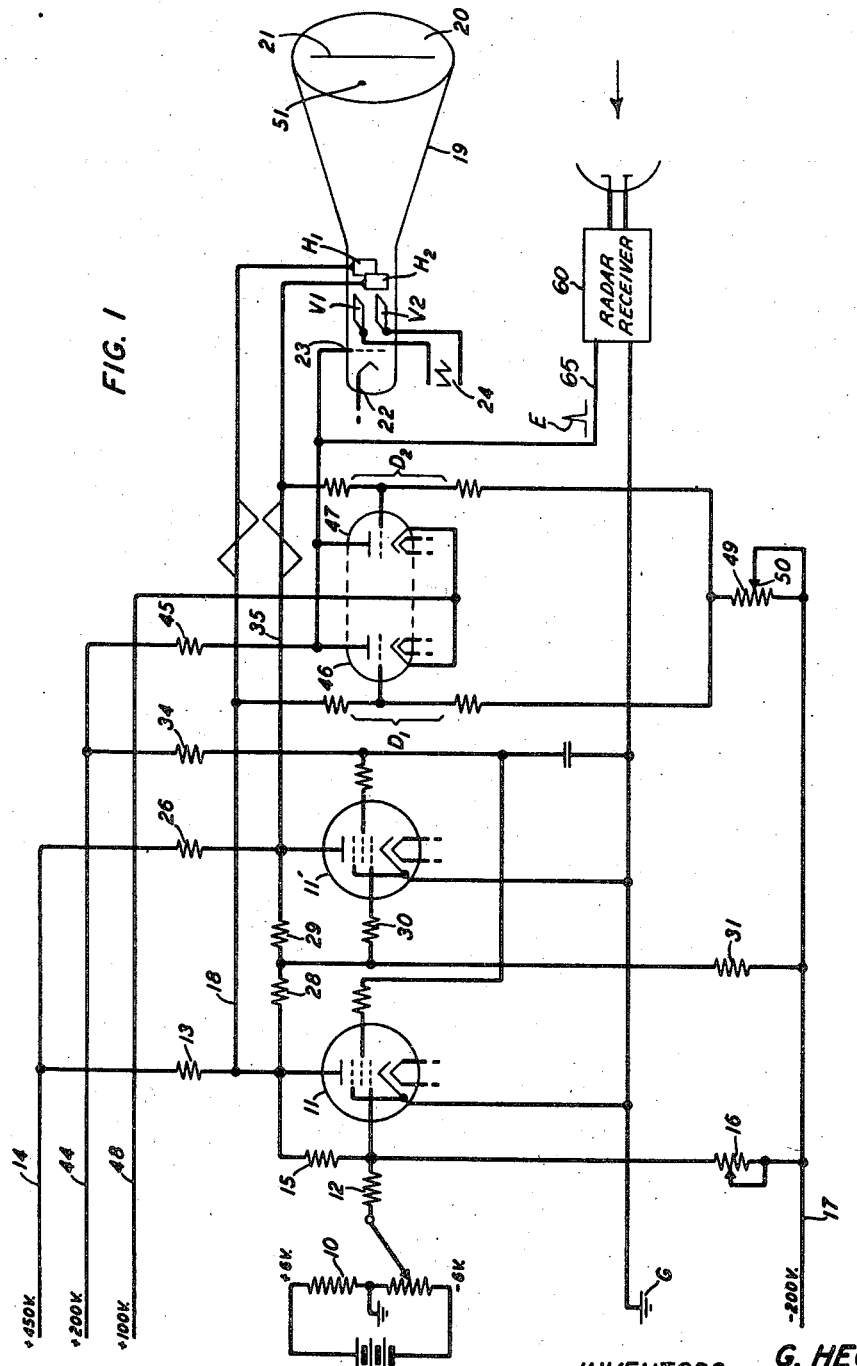
Fig. 1 shows the circuit of the invention in a preferred embodiment.

Referring to Fig. 1, 10 indicates symbolically a source of voltage varying, in the example chosen, symmetrically between −6 and +6 volts, corresponding respectively to the extreme left and right facings of a radar beam. Since the production of such a beam and the circuit of which the output is the azimuth voltage are no part of the present invention, the apparatus therein concerned is not shown in Fig. 1.

The voltage from source 10 may be applied through the resistor 12 to the control grid of tube 11. This control grid is also connected through resistor 15 to the anode of the same tube, and through the variable resistor 16 to −200 volts on conductor 17. The anode of tube 11 is also connected through resistor 13 and conductor 14 to a source of +450 volts, and by conductor 18 to horizontal plate H1 of cathode ray oscilloscope 19. Variable resistor 16 is normally adjusted so that when zero voltage is supplied from source 10, the anode of tube 11 rests at +225 volts with respect to ground, the grid then having a bias of approximately −6 volts, produced by IR drop in resistor 12. Oscilloscope 19 is a conventional cathode ray tube, understood to be provided with the usual elements, of which it is necessary here to show only screen 20 with vertical line 21 horizontally centered, cathode 22, intensity grid 23 and deflecting plates H1 and H2 for the horizontal, V1 and V2 for the vertical deflection. The electron stream is understood to be normally biased, by means not shown, to the bottom of screen 20; a repetitive saw-tooth voltage 24 is applied between vertical plates V1 and V2 causing the electron trace on screen 20, if not blanked, to traverse the screen from bottom to top at a repetitive rate much greater than the rate of horizontal sweep which is to be followed by a deflecting voltage on plates H1 and H2. The period of saw-tooth voltage 24 is the interval between successive radar pulses, which may occur thousands of times a second while the horizontal left and right sweeps of the radar beam may occupy an interval only a little shorter than the persistence of vision.

Under the conditions stated, the potential of the anode of tube 11 is +225 volts with respect to ground, and so is that of plate H1. In order to place plate H2 at the same potential, a phase inverter circuit is employed which includes tube 11' of which the anode is connected to +450 volts through resistor 26 and conductor 14, and through resistors 28 and 29 to the anode of tube 11. From the junction of those resistors is taken a connection through resistor 30 to the control grid of tube 11' and through resistor 31 to −200 volts on conductor 17. The screen grids of both tubes 11 and 11' are connected through individual 180-ohm resistors through resistor 34 to +200 volts, the junction with resistor 34 being capacitatively by-passed to ground. As a result both screen grids are at a potential approximately 150 volts positive to ground. Tubes 11 and 11' are suitably each a 6AG7; cathode heating power is understood, but not shown, for these tubes and for the tubes later to be mentioned.

The values of resistances 26, 28, 29 and 31, given in a later table, are so proportioned that in the presence of zero voltage from source 10, the anodes of tubes 11 and 11' are each 225 volts positive to ground, their grids each being approximately 6 volts negative to ground, whereas any deflecting voltage from source 10 other than zero causes the anodes of tubes 11 and 11' to depart from +225 volts by equal and opposite amounts.

It will be recognized that the circuit of tubes 11 and 11' is adapted, with modifications, from that disclosed by R. E. H. Carpenter in United States Patent 1,999,318, April 30, 1935.

The anode of tube 11' is connected via conductor 35 to the horizontal plate H2 of oscilloscope 19; thus for zero deflecting voltage there is no potential difference between plates H1 and H2, and the electron stream, unless blanked by a voltage on the intensity grid of the oscilloscope, will produce a bright spot horizontally centered on the oscilloscope screen, which will be drawn out vertically into a line by the operation of the repetitive vertical sweep voltage.

Figure 2:
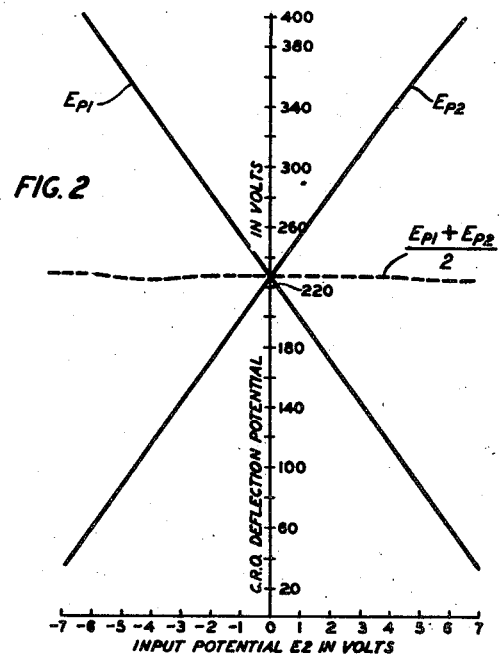
Fig. 2 shows curves relating the voltages on the horizontal plates of the oscilloscope to the azimuth voltage.

An input voltage from source 10, corresponding to a left or right facing of the radar beam, changes equally and oppositely the grid voltages of tubes 11 and 11' and likewise, with amplification changes in a reverse sense the potentials of conductors 18 and 35, connected to their respective anodes. In a horizontal sweep cycle the input potential varies from −6 to +6 volts and the voltages on plates H1 and H2 vary from about +392 volts to about +58 volts, and from +58 volts to +392 volts, respectively, or vice versa, depending on the polarity of the voltage from source 10, their average value remaining +225 volts. This voltage variation of plates H1 and H2 is shown in Fig. 2.

There is now provided a normal voltage of +200 volts on intensity grid 23, from conductor 44 through 5100-ohm resistor 45. In parallel with grid 23, +200 volts is also supplied to the two anodes of tubes 46 and 47, which may conveniently be the two halves of a double triode such as the 6SL7. The cathodes of these tubes are joined together and to a voltage of +100 volts on conductor 48. Voltage dividers D1 and D2 are connected, respectively, between conductors 18 and 17 and between conductors 35 and 17, a common resistance 49 being included between −200 volts and the ends of D1 and D2 remote from their respective voltage supplies, resistance 49 being variable from zero to 50,000 ohms by adjustment of tap 50. With zero voltage from source 10, plates H1 and H2 are each at +225 volts potential and the potential of intensity grid 23 is +200 volts, sufficient to brighten the electron trace on screen 20. At the same time each of tubes 46 and 47 is cut off, their cathodes being 100 volts positive while each of their grids is 87 volts positive when tap 50 is set to short all of resistance 49. In both D1 and D2, 0.46 megohm is connected between conductor 18 (or 35) and the corresponding grid; 1.0 megohms between this grid and resistor 49.

Now, when a positive voltage is received from source 10 by the grid of tube 11, the anode voltage of that tube falls while the like voltage of tube 11' rises, and with these anode voltages plates H1 and H2 are no longer at the same potential and the electron stream moves toward plate H2. At the same time, the increased voltage of conductor 35 raises the grid voltage of tube 47 above cut-off; the anode voltage of this tube consequently falls taking with it the anode voltage of tube 46 and the voltage of grid 23. The electron stream is therewith blanked. The grid voltage drop at tube 46 has here no effect.

The voltage drop at the anode of tubes 46 and 47 will similarly appear if the voltage from source 10 is negative, being now occasioned by the voltage increase on conductor 18 which carries the grid voltage of tube 46 above cut-off.

How far the voltage from source 10 must depart in either direction from zero in order to reduce the voltage element on grid 23 enough to blank the trace depends on the initial bias of the grids of tubes 46 and 47; the further these tubes are initially biased below cut-off, the more must be the voltage change from zero at source 10, and so the wider the line 21. This line may appear as of finite width because many repetitions of the vertical sweep voltage 24 take place in the interval each side of zero voltage from source 10, and the corresponding electron spot traces fuse into a vertical rectangle centered horizontally between plates H1 and H2.

Line 21 is widest when tap 50 shorts the whole of resistor 49. Moving tap 50 downward obviously increases the initial positive voltage on the grids of tubes 46 and 47, bringing these tubes nearer to plate current conduction, so that a smaller change in the voltage on conductors 18 and 35 is needed to make conducting one or the other of tubes 46, 47, therewith lowering to the blanking value the voltage on grid 23.

Figure 3:
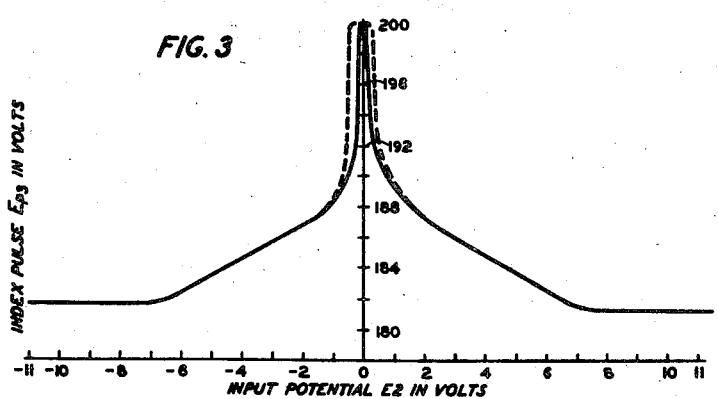
Fig. 3 is a curve showing the relation of the azimuth voltage to the voltage on the intensity grid of the oscilloscope.

Fig. 3 shows the variation in voltage on grid 23 as the voltage of source 10 sweeps from positive to negative extreme values in following the position of the radar beam. It is easy to calibrate the voltage from source 10 in terms of horizontal angle from dead ahead, or in feet, if desired. An echo from an irradiated object may, by known means, be caused to add an independent brightening voltage pulse to intensity grid 23; in such case a spot, as at 51, appears on screen 20. The source of the independent brightening voltage is symbolically shown as radar receiver 60 producing, when an echo is received, a sharp positive voltage pulse E applied to grid 23 by way of conductor 65; the electron beam is thereby momentarily unblanked and spot 51 appears. The range of the object is shown by the vertical location of spot 51 above a horizontal line (not indicated) on the screen at the foot of line 21, and the bearing of the object is shown by the horizontal displacement of spot 51 left or right of line 21.

If some value other than +200 volts is desired for the normal "bright" potential on grid 23, a capacitor may obviously be connected in series with this grid, and a grid leak connected from the grid to a suitable bias potential, in conventional manner.

While there is shown in Fig. 1 an oscilloscope with electrostatic deflecting plates, it is, of course, possible to provide magnetic deflecting coils for both vertical and horizontal deflections. The vertical deflecting coil is to be connected in the conventional manner, while the horizontal deflecting coil is connected at its mid-point to ground and at its terminals to one and to the other of conductors 18 and 35, through suitable resistors or other coupling means. Equal and opposing magnetic fields are produced by the currents in the two halves of the horizontal coil when the potentials are the same on conductors 18 and 35, and these fields are appropriately unbalanced when the potentials are oppositely varied by a voltage from source 10 other than zero. It is within the skill of the art to make the necessary allowance for the inductances of the coils.

Other changes from the circuit shown in Fig. 1 will suggest themselves to those skilled in the art, who will recognize that the invention consists in providing a negative voltage pulse on grid 23, when the potential of either of conductors 18 and 35 departs from its normal value by a preselected amount, the width of the resulting bright vertical line being proportional to this selected voltage change. Certain resistances used in an actual circuit according to Fig. 1 were as follows:

| Resistor | Resistance |
| --- | --- |
| 12 | 40,000 ohms. |
| 13 | 20,000 ohms. |
| 15 | 1.125 megohm. |
| 16 | 0.6 megohm (approximate setting). |
| 26 | 20,000 ohms. |
| 28 | 1.20 megohm. |
| 29 | 1.25 megohm. |
| 30 | 180 ohms. |
| 31 | 0.515 megohm. |
| 34 | 6,800 ohms. |

The reader will recognize that in the case of either magnetic or electrostatic deflecting means, a spot positioning voltage is applied thereacross, which varies in sign and value with the voltage from source 10; the voltage of the control grid is normally great enough to permit the appearance of spot 51 on screen 20 and is reduced below this value whenever the positioning voltage departs from zero in either direction by a preselected and controllable amount. Obviously, by a like circuit, the vertical appearance of the spot could be confined to a position vertically centered on the screen, in the absence of a brightening voltage corresponding to an observed object.

What is claimed is:

1. A cathode-ray oscilloscope circuit responsive to a source of voltage varying in each direction from zero, comprising a cathode-ray oscilloscope provided at least with a screen, a source of cathode-rays adapted to produce on the screen a bright spot, a control grid of which the voltage determines the appearance of the spot and a pair of horizontal deflecting plates, a phase inverter circuit controlled by the varying voltage to apply to the plates separately voltages varying in proportion to the varying voltage equally and oppositely from a normal value, means for applying to the control grid a voltage normally adequate to insure the appearance of the spot and means controlled by the inverter circuit to reduce the control grid voltage when either of the plate voltages departs positively by a prescribed amount from the normal value.

2. For a cathode-ray oscilloscope provided at least with a screen, a source of cathode-rays adapted to produce on the screen a bright spot, a control grid of which the voltage determines the appearance of the spot and with means responsive to an applied voltage for deflecting the spot, means for defining the spot position corresponding to zero voltage applied to the deflecting means comprising means for applying to the control grid a voltage normally adequate to insure the appearance of the spot, means for applying to the deflecting means a variable spot positioning voltage and means controlled by the last-named means for reducing the control grid voltage when the positioning voltage varies in either direction by a prescribed amount from zero.

3. In a system of apparatus comprising a cathode-ray oscilloscope provided at least with a screen, a source of cathode-rays adapted to produce on the screen a bright spot, a control grid of which the voltage determines the appearance of the spot and with horizontal and vertical spot deflecting means, a source of repetitive voltage applied to the vertical deflecting means and a source of representative voltage in accordance with the value and sign of which the spot is horizontally positioned on the screen, means for defining a vertical bright line on the screen horizontally corresponding to the zero of the representative voltage, comprising a phase inverter circuit controlled by the representative voltage and applying to the horizontal deflecting means a net voltage thereacross normally zero and varying from zero proportionally to the value and in accordance with the sign of the representative voltage, means for applying to the control grid a voltage normally adequate to insure the appearance of the spot and means controlled by the inverter circuit for reducing the control grid voltage when the net voltage departs in either direction from zero by a preselected amount.

4. A system of apparatus as in claim 3, including means for varying the preselected amount, thereby controlling the width of the vertical bright line.

5. In a cathode-ray oscilloscope provided at least with a screen, a source of cathode-rays adapted to produce on the screen a bright spot, a control grid of which the voltage determines the appearance of the spot and with means responsive to an applied voltage for deflecting the spot, means for confining the appearance of the spot to a portion of the screen the center of which corresponds to zero voltage applied to the deflecting means comprising means for applying to the control grid a voltage normally adequate to insure the appearance of the spot, means for applying to the deflecting means a variable spot positioning voltage, means controlled by the last-named means for reducing the control grid voltage when the positioning voltage varies in either direction from zero by a controllable amount corresponding to the desired extent of appearance of the spot.

GEORGE HECHT.
LARNED A. MEACHAM.

REFERENCES CITED

The following references are of record in the file of this patent:

UNITED STATES PATENTS

| Number | Name | Date |
|---|---|---|
| 2,329,199 | Hefele | Sept. 14, 1943 |
| 2,367,728 | Mahoney, Jr. | Jan. 23, 1945 |
| 2,399,754 | Miller | May 7, 1946 |
| 2,418,133 | Miller et al. | Apr. 1, 1947 |
| 2,423,104 | Labin | July 1, 1947 |